Jan. 7, 1969    J. E. HALLBERG    3,420,496
SOLENOID VALVE ASSEMBLY
Filed Jan. 9, 1967
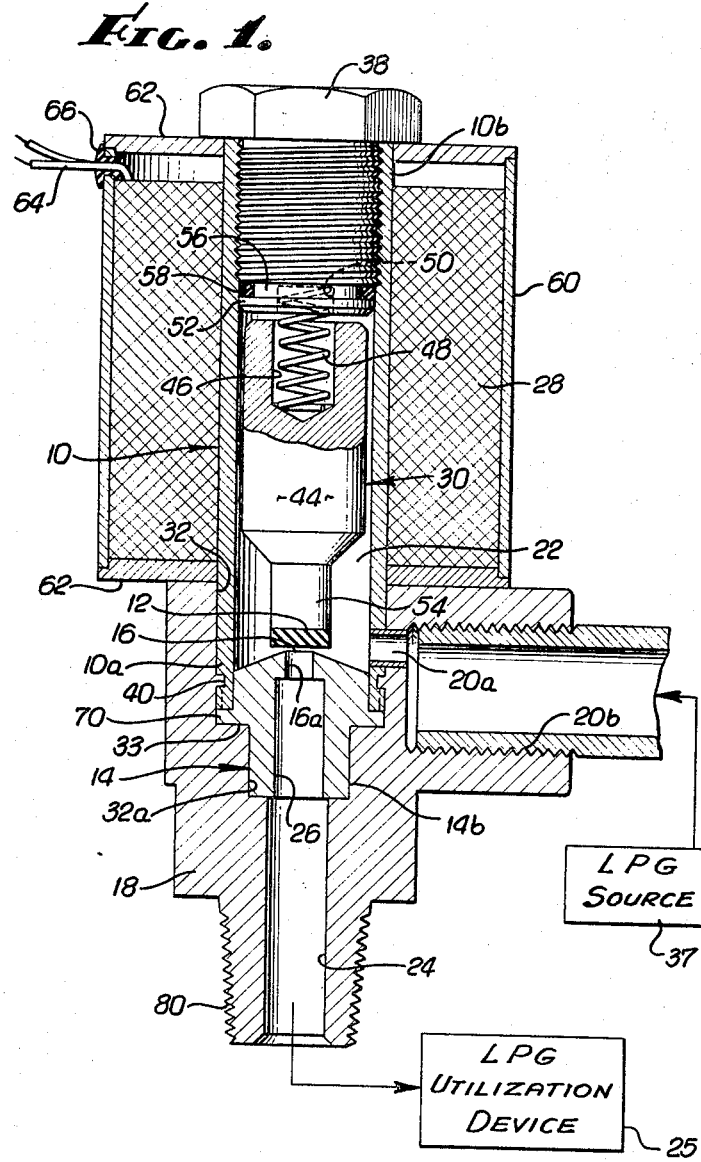
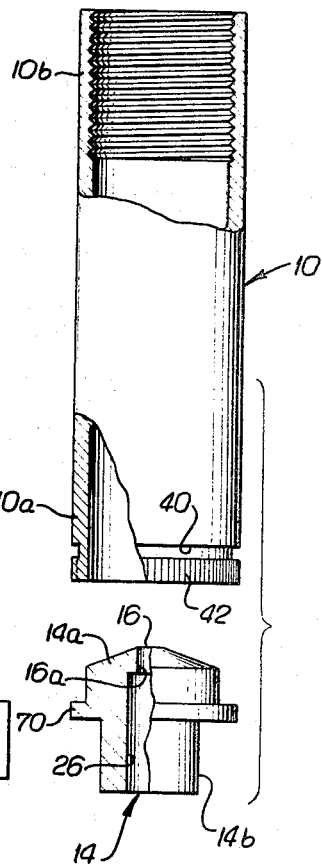
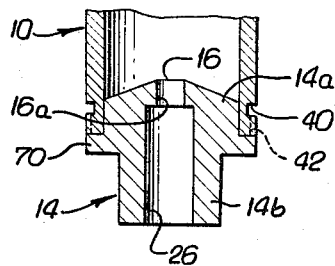
INVENTOR.
JOHN E. HALLBERG
By White & Haefliger
ATTORNEYS.

United States Patent Office 3,420,496
Patented Jan. 7, 1969

3,420,496
SOLENOID VALVE ASSEMBLY
John E. Hallberg, Rosemead, Calif., assignor to MacBee Engineering Corporation, South El Monte, Calif., a corporation of California
Filed Jan. 9, 1967, Ser. No. 608,113
U.S. Cl. 251—141
Int. Cl. F16k 31/06; F16k 51/00
7 Claims

ABSTRACT OF THE DISCLOSURE

A solenoid valve assembly is provided in which the conventional solenoid coil operated plunger is employed but in which, novelly, the body portion of the valve is individually formed by molding, casting or otherwise shaping material around a plunger guiding sleeve having a valve seat insert therein, to form the body and to retain the valve seat insert within the sleeve.

Background of the invention

Field of the invention

The present invention provides a solenoid valve construction which is broadly useful in all areas of flow control; the device is particularly adapted to control of liquified petroleum gas (LPG) flow.

Description of the prior art

Solenoid valves are well-known and have been applied to the control of LPG using processes. It is the current practice to make such valves by milling and machining brass or other chemically resistant metal to the desired configuration. The extensive milling and shaping of the metal to critical tolerances particularly at the valve seat is costly in labor required and material waste.

Summary of the invention

The present invention eliminates extensive machining in solenoid valve assembly by forming the body portion of the valve about a separately formed valve seat means and plunger guiding sleeve. That is, the invention provides a solenoid valve assembly including a sleeve, a valve moveable lengthwise of and within the sleeve, a tubular insert carried at one end portion of the sleeve and providing a seat engageable by the valve, a body formed about the insert and the end portion of the sleeve to retain the insert at that end, the body being provided with a first passage communicating through the side of the sleeve with the valve and a second passage communicating through the insert with the valve, and a solenoid operated plunger moveable lengthwise of and within the sleeve to move the valve relative to the seat, thereby to control fluid flow between the passages via the insert.

The body is typically a metallic casting, e.g. of aluminum or other metal having a melting temperature lower than the melting temperature of the sleeve and insert. Also, the metal in the casting process engages peripheral shoulders on the sleeve, typically of steel, to provide a positive interlock blocking relative axial and rotary displacement between the casting and the sleeve.

The tubular insert is desirably also fabricated of steel and includes a head projecting into the sleeve and a flange extending opposite the end of the sleeve and in abutting relation therewithin, the body casting blocking relative separation of the insert flange and sleeve end.

There may be provided projecting at the exterior side of the sleeve a reduced portion of the first passage with the casting extending thereabout and conveniently forming an enlarged portion of the first passage outwardly of the reduced portion for reception of a fitting.

The plunger may be spring biased in a direction to seat the valve and be mounted within a solenoid for magnetically operating the plunger in a direction to unseat the valve.

Brief description of the drawings

FIG. 1 is a side view in section of an assembled form of the valve.

FIG. 2 is a view in elevation thereof, partly broken away to show underlying constructional features of the sleeve and tubular insert which are alined as for assembly; and FIG. 3 is a view in section of the sleeve and tubular insert, in assembly.

Description of a preferred embodiment

Referring to the drawings a valve assembly is shown in accordance with a preferred form of the invention including a sleeve 10, a valve 12 moveable lengthwise within the sleeve, a tubular insert 14 carried at the lower end 10a of the sleeve and providing a seat 16 above orifice 16a engageable by the valve. The insert includes a head 14a having press fit engagement with the sleeve bore. A body 18 is formed about the insert and the circumscribing portion of the sleeve to retain the insert in position. The body is provided with a first passage including portions 20a and 20b communicating through the side of the sleeve to the valve chamber 22 and a second passage 24 communicating through the valve insert bore 26 to the valve chamber. A solenoid coil 28 surmounts the body circumscribing the sleeve for electromagnetically operating plunger 30 within the sleeve for lengthwise movement carrying the valve 12 from the seat 16 thereby to control communication and fluid flow between the passages 20a–b and 24 via the bore 26 of the tubular insert.

The body 18, which may be formed of a castable or moldable material preferably having a relatively low melting temperature such as aluminum, copper or synthetic organic material, polyacetal or nylon, is seen to include an enlarged counterbore 32 receiving the lower portion 10a of the sleeve and the flange 70 on the insert 14, the flange seating against an annular shoulder 33 of body 18. A reduced body counterbore 32a receives the stem 14b of the insert, and the body central bore defines the second passage 24 leading to an LPG utilization device 25. For convenience in installation, the lower extent of the body is exteriorly threaded at 80 coaxially with the passage 24. Formed at generally a right angle to the central bore is the first passage portion 20b interiorly threaded to accommodate fitting 36 leading from a source of fluid such as a LPG source 37. The first passage portion 20a is greatly restricted at the entrance to the valve chamber 22, to provide a reduced portion of said passage.

The sleeve 10 is interiorly threaded at its upper end 10b to engage the threaded stem of a plug shown as a cap bolt 38. The lower end 10a of the sleeve is peripherally provided with shoulder structure to be engaged by the casting comprising the body 18 to provide positive interlocking; thus blocking relative axial and rotary displacement between the valve body and the sleeve, the insert also being held in place. Such shoulder structure is for example defined by a peripherally extending recess or groove 40 in the sleeve and longitudinally extending serrations 42.

Within the sleeve there is mounted a solenoid operated plunger 30 shown to include a generally cylindrical shank 44 centrally recessed at 46 to accommodate a coil spring 48, which at its upper end is seated in recess 50 in the stem 52 of the cap bolt to resiliently urge the plunger toward the valve seat 16, so that the valve 12, carried on the reduced section 54 of the plunger, is normally urged into closed position, cutting off communication between the first and second passages of the body. The bolt has a peripheral groove 56 for retaining sealing ring 58 to seal off against the sleeve bore, preventing leakage from the chamber 22.

The solenoid coil 28 is enclosed within a cylindrical casing 60 closed at opposite ends by plates 62 and electrically connected by leads 64 extending through grommet 66 to a power source (not shown). Application of a suitable voltage to the coil, magnetically induces the plunger 30 to move against the biasing of the spring 48, thereby to open the valve.

The sleeve and insert therein are generally formed of high melting materials such as steels to enable formation of the body casting around these elements. Particularly, the shoulder structure provided to interlock the sleeve, tubular insert and body should be of a temperature resistant material so that such interlocking is accomplished upon casting the body forming material around the preassembled sleeve and tubular insert.

In assembling the valve device of the present invention the sleeve 10 is interfitted with the tubular insert 14 and the assembly placed in a casting mold of appropriate configuration. The body 18 is then cast about the preassembly. Appropriate threading is provided in the mold or subsequently by tapping. The securely interlocked sleeve, tubular insert and body are then combined with a solenoid coil 28 within casing 60. Cap bolt 38 is then screwed into the upper and 10b of the sleeve to bear against casing upper plate 62 and thus maintain the components in assembled relation.

In summary, it will be noted that the present valve assembly affords an easily constructed solenoid valve device utilizing simple, easily obtained parts which because separately formable prior to assembly can be held to close tolerances, for great accuracy in flow control, all without extensive machining or wastage of materials.

Thus having described my invention, as to an illustrative embodiment thereof, it is obvious many modifications may be resorted to within the scope and spirit thereof and the invention is not to be construed as limited to the particular embodiment described.

I claim:
1. In a solenoid valve assembly,
a sleeve,
a valve movable lengthwise of and within the sleeve,
a tubular insert carried at one end portion of the sleeve and a seat on the insert engageable by the valve,
a body formed about the insert and said end portion of the sleeve to retain the insert at said end, said body having a first passage communicating through the side of the sleeve with said valve and a second passage communicating through the insert with said valve,
and a solenoid operated plunger movable lengthwise of and within the sleeve to move the valve toward and away from the seat thereby to control fluid flow between said passages via the insert.

2. A valve assembly as defined in claim 1 wherein said body comprises a metallic casting, the sleeve having peripheral shoulders engaged by the casting to provide positive interlock blocking relative axial and rotary displacement between the casting and sleeve.

3. A valve assembly as defined in claim 2 wherein the insert includes a head projecting within the sleeve and a flange extending opposite said end of the sleeve, the casting blocking relative separation of the insert flange and sleeve.

4. A valve assembly of claim 3 in which the insert and sleeve consist of steel and the casting consists of a metal having a melting temperature substantially below the melting temperature of steel.

5. The valve assembly of claim 4 in which the casting consists of aluminum.

6. A valve assembly as defined in claim 2 including a reduced portion formed in said first passage, said casting extending thereabout and forming an enlarged portion of said first passage outwardly of said reduced portion for reception of a fitting.

7. A valve assembly as defined in claim 1 including a plug closing the opposite end of the sleeve, a spring in the sleeve urging the plunger in a direction to seat the valve, and a solenoid extending about the sleeve to magnetically operate the plunger in a direction to unseat the valve.

References Cited
UNITED STATES PATENTS 2,479,398    8/1949    Parsons  ---------- 251—141 X
3,357,454   12/1967    Koutnik  ---------- 251—141 X ARNOLD ROSENTHAL, *Primary Examiner.*

U.S. Cl. X.R.
251—368